United States Patent [19]
Cohen

[11] Patent Number: 4,742,976
[45] Date of Patent: May 10, 1988

[54] RAM AIR TURBINE AND DEPLOYMENT MECHANISM

[75] Inventor: Mordehy Cohen, Rockford, Ill.

[73] Assignee: Sundstrand Corporation, Rockford, Ill.

[21] Appl. No.: 743,086

[22] Filed: Jun. 10, 1985

[51] Int. Cl.[4] ............................................ B64D 41/00
[52] U.S. Cl. .................................................... 244/58
[58] Field of Search ...................... 244/58, 137 A, 54; 290/44, 55; 416/142 B, DIG. 4, 139 A, 51 A

[56] References Cited

U.S. PATENT DOCUMENTS

| | | | |
|---|---|---|---|
| 254,031 | 2/1882 | Longman . | |
| 2,583,369 | 1/1952 | Fumagalli | 416/DIG. 4 |
| 2,978,209 | 4/1961 | Kerry | 244/58 |
| 3,149,678 | 9/1964 | Chilman et al. | 244/58 |
| 3,275,198 | 9/1966 | Barlow | 222/310 |
| 3,320,896 | 5/1967 | Roy, Jr. | 103/94 |
| 3,638,421 | 2/1972 | Chilman | 244/58 |
| 3,774,466 | 11/1973 | Bhatia et al. | 74/417 |
| 4,068,131 | 1/1978 | Jacobs et al. | 290/55 |
| 4,340,822 | 7/1982 | Gregg | 416/142 B |
| 4,411,596 | 10/1983 | Chilman | 416/51 |

FOREIGN PATENT DOCUMENTS

| | | | |
|---|---|---|---|
| 2951635 | 7/1981 | Fed. Rep. of Germany | 416/142 B |
| 148943 | 11/1979 | Japan | 416/142 B |

OTHER PUBLICATIONS

Cohen application, Ser. No. 685,475, filed Dec. 24, 1984.

Primary Examiner—Joseph F. Peters, Jr.
Assistant Examiner—Lynn M. Fiorito
Attorney, Agent, or Firm—Wood, Dalton, Phillips, Mason & Rowe

[57] ABSTRACT

A ram air turbine and deployment mechanism has commonly had power-generating means in the form of either one, or both, of a hydraulic pump and electrical generator mounted at the end of a pivotal strut adjacent the ram air turbine. Relocation of the power-generating means can provide a system with improved operation, lesser weight and other improvements over prior known systems.

The ram air turbine is mounted at the end of a pivotal strut for movement between stowed and deployed positions. The electrical generator forms a major part of the strut and is located close to the pivot axis of the strut. The hydraulic pump is mounted to aircraft structure within the stowing compartment of the aircraft and has a driven member aligned with the pivot axis of the pivotal strut. The drive of the generator and the pump is derived from rotation of the rotatable hub assembly of the ram air turbine which drives rotatable shaft means within the strut by a first angled spiral gear drive between the ram air turbine and the generator and a second angled spiral gear drive between the rotatable shaft means within the strut and the driven member of the hydraulic pump. The speed relation between the components is determined by sizing of the gears of the angled spiral gear drives wherein the ram air turbine, the generator, and the hydraulic pump can all be operated at optimum speed to maximize the performance of each of the components.

7 Claims, 3 Drawing Sheets

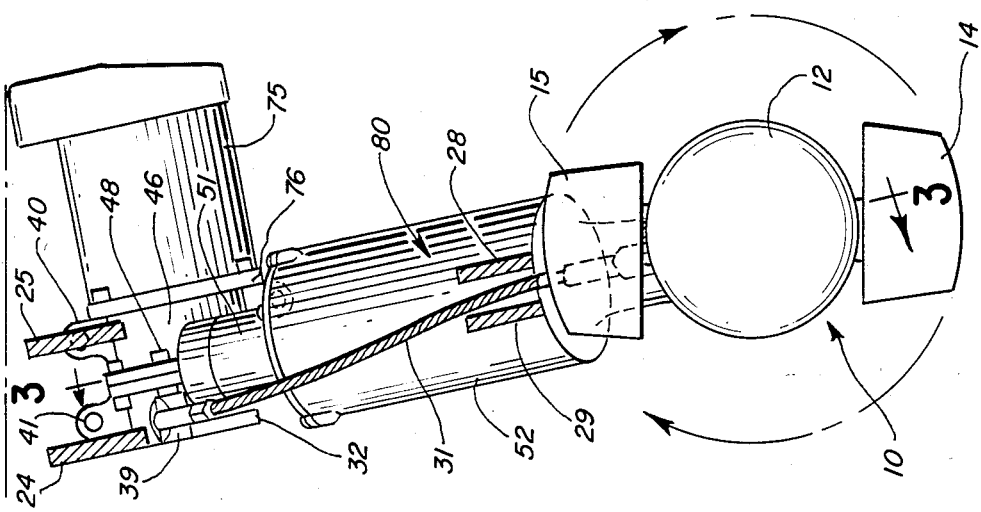
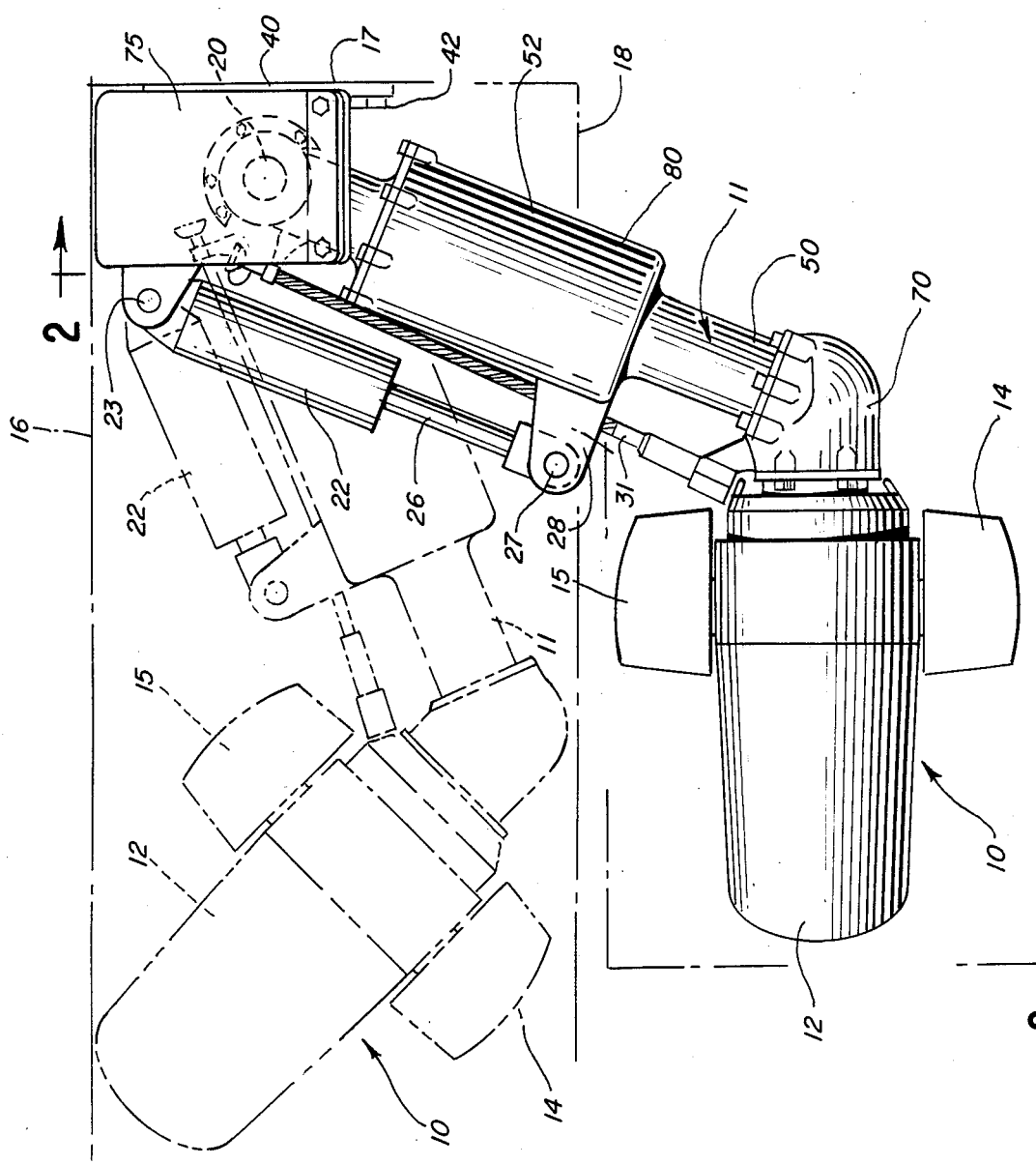
FIG. 2
FIG. 1

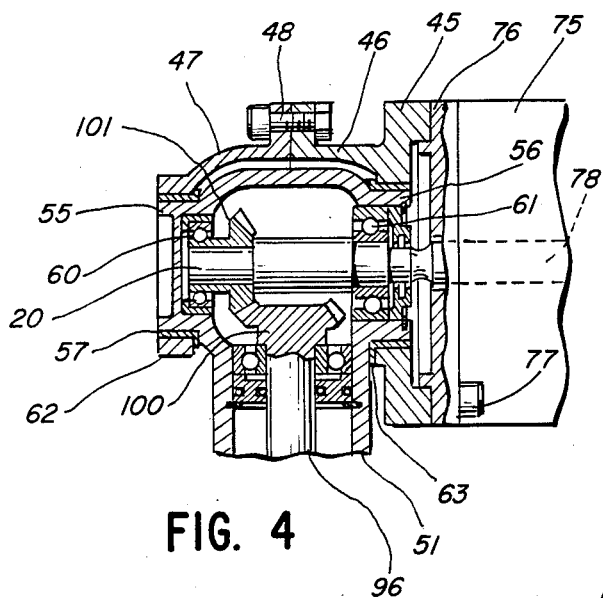
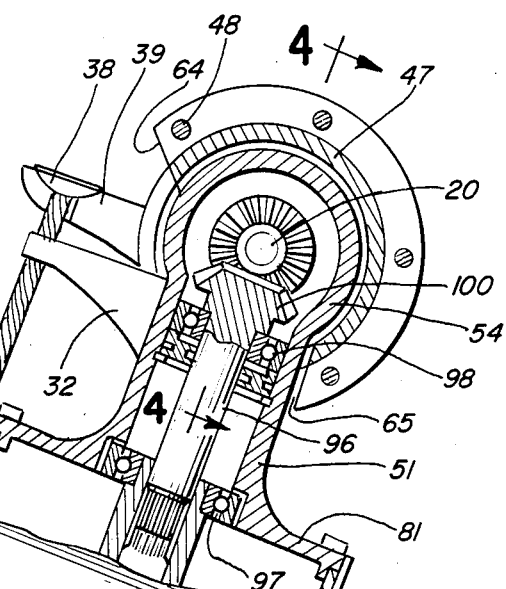
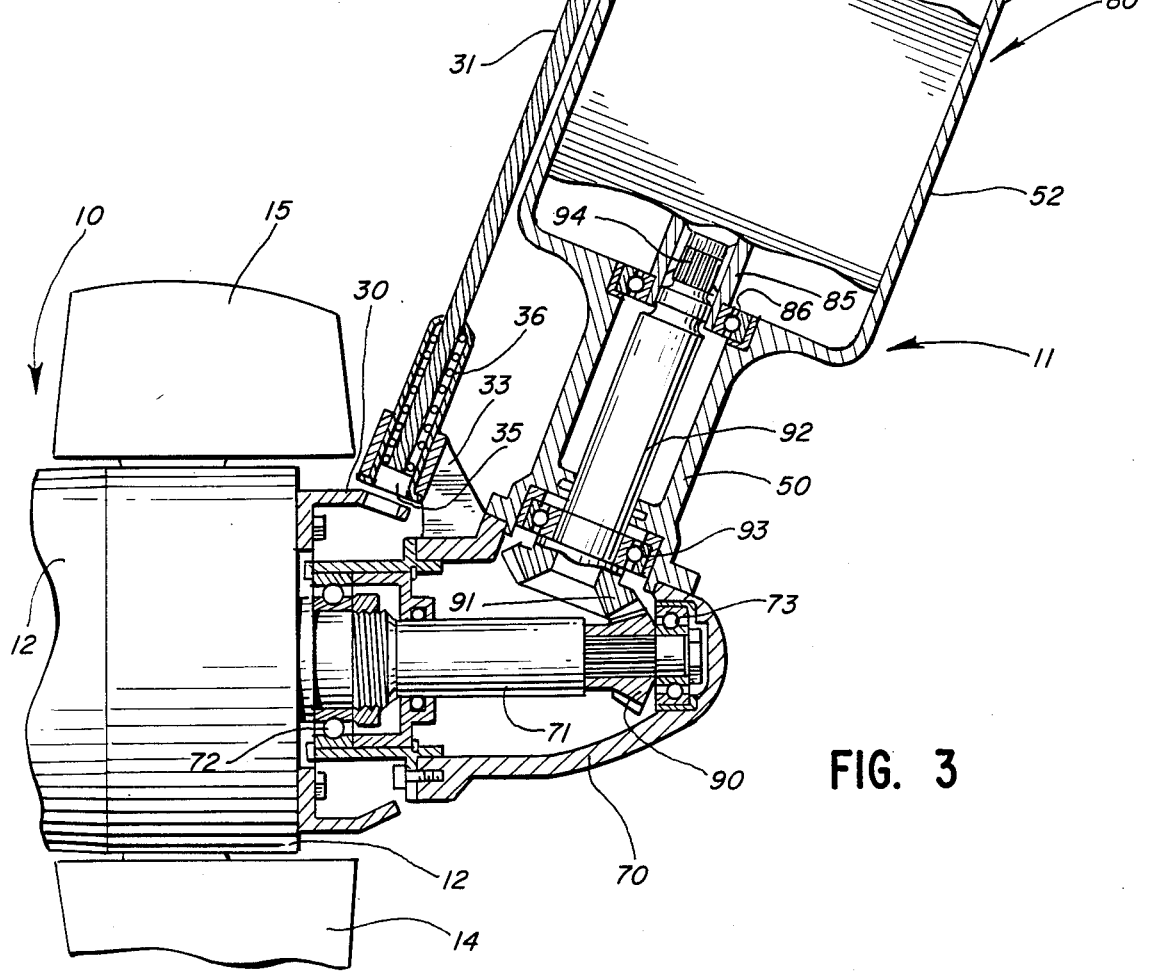
FIG. 4
FIG. 3

RAM AIR TURBINE AND DEPLOYMENT MECHANISM

DESCRIPTION

1. Technical Field

This invention pertains to a ram air turbine and deployment mechanism for use with an aircraft to provide an emergency power source by driving one or both of a hydraulic pump and an electrical generator when there is a failure of the primary power system of the aircraft.

2. Background Art

A ram air turbine is a known device and is used on aircraft to provide a power source upon failure of the aircraft engines which provide the normal power source for driving electrical and hydraulic power generators. The Chilman Pat. No. 4,411,596, owned by the assignee of this application, discloses such a device. In the Chilman patent, a pivoted strut mounts the ram air turbine for movement between stowed and deployed positions. Either a pump or generator, or both, can be mounted coaxially with a drive shaft extending from a rotatable hub assembly of the ram air turbine.

The ram air turbine is normally stowed within a compartment in the aircraft fuselage and is brought into operation by movement to a deployed position sufficiently removed from the compartment whereby a plurality of blades mounted on the rotatable hub assembly of the ram air turbine are disposed in the airstream and in a position to freely rotate without interference from the aircraft fuselage. The airstream causes the ram air turbine to rotate and drive the electrical or hydraulic power generating means. A number of commercial aircraft are equipped with a ram air turbine and, in at least one known instance, the ram air turbine came into operation to provide sufficient power to enable the aircraft pilot to control the flight surfaces of the aircraft and achieve a safe landing.

It is conventional to mount a pump and/or generator adjacent the rotatable hub assembly of the ram air turbine, as shown in my copending application, Ser. No. 685,475, filed Dec. 24, 1984. This results in a moment of inertia of the ram air turbine and the deployment mechanism which is fairly large relative to the axis of deployment. Additionally, there are weight penalties associated with such a structure, since the strut of the deployment mechanism must be of a size to have the strength to support the pump and generator as well as the weight of the electrical and hydraulic components used to connect the generator and pump to the power systems of the aircraft.

The Barlow Patent No. 3,275,198 discloses an airstream-driven pumping system having an air-driven turbine rotatably mounted at the outer end of a strut fixed to the aircraft fuselage. The turbine drives a pump mounted within a casing supported outside of the aircraft and which mounts the strut supporting the turbine. The Barlow patent system does not show a pivotally-mounted strut whereby the turbine can be moved between stowed and deployed positions and does not show a pump located within a compartment of the aircraft fuselage to be out of the airstream.

DISCLOSURE OF THE INVENTION

A primary feature of the invention is to provide a ram air turbine and deployment mechanism having a pump and/or generator associated therewith providing enhanced operational characteristics with maximization of the performance of the ram air turbine, the generator and the pump with high system reliability. Additionally, the ram air turbine and deployment mechanism provide for minimization of airflow blockage and drag loads, as well as compact size for minimal storage space within the aircraft fuselage and low system weight and with a very small moment of inertia about an axis of deployment of the ram air turbine to minimize the size of the deployment actuator.

In accomplishing the foregoing, the ram air turbine is movable between a stowed position within a compartment in the aircraft fuselage and a deployed position wherein a rotatable hub assembly mounting a plurality of blades is positioned to have the blades in the airstream and free to rotate without interference with the aircraft fuselage. The deployment mechanism has a pivotal strut with a generator housing defining a major part of the length of the strut. A pump is fixed to the frame of the aircraft within the aircraft fuselage and has a driven member aligned with the pivot axis of the pivotal strut. A drive shaft, driven by the rotatable hub assembly of the ram air turbine, is drivingly connected to a rotatable shaft in the strut associated with the generator shaft for driving thereof and there is also a drive connection at the pivot axis of the pivotal strut for driving connection to the driven member of the pump. This structural arrangement provides a number of structural and performance advantages over prior structures.

The reliability of the ram air turbine and deployment mechanism is high, since the pump is mounted to the aircraft structure and does not have to swing out with the ram air turbine and strut. There is no need for swivel joints and the seals and cores associated with the fluid flow path when the pump is mounted with the ram air turbine for movement to the deployed position in the airstream. Further, since the pump is mounted directly to the structure of the aircraft, pressure drops along the fluid flow path are reduced, which is particularly important at low ambient temperatures.

The ram air turbine is mounted to the strut at an acute angle and the drive shaft extending from the ram air turbine is connected to a rotatable shaft within the strut by a first angled spiral bevel gear drive. The rotatable shaft within the strut is associated with the shaft of the generator and another section of the rotatable shaft extends to a pivot axis for the strut where a second angled spiral bevel gear drive interconnects the rotatable shaft with the driven member of the pump. The angled spiral bevel gear drives result in the capability of each of the three operative components, namely, the turbine, the pump, and the generator, operating at different speeds. It is therefore possible to have each component running at its optimum speed to maximize performance. With maximized performance, the weight of each of these components can be minimized. Additionally, the capability of running each component at its optimum speed enables running the ram air turbine at a high speed and, therefore, the blade tip diameter can be smaller, resulting in a more compact design. In addition to the aforesaid reduction in weight resulting from maximum performance from the components, there is additional weight reduction, since the generator housing serves as a major part of the pivotally-mounted strut, there are no fluid lines and swivel joints in the pump circuit, and the strut does not have to carry the weight of the pump. Additionally, the generator is located close to the pivot axis for the strut, rather than being mounted at the end thereof adjacent the ram air turbine.

A portion of the strut mounting the ram air turbine, which is located between the generator housing and the ram air turbine, can be relatively narrow because it does not have to support large loads and there are no fluid lines that have to pass through it. The resulting narrow strut lies to the rear of the ram air turbine blades relative to the airstream flowing therepast and therefore the narrow strut reduces the air blockage behind the turbine and improves the turbine performance and reduces drag loads.

A further improvement resulting from the ram air turbine and deployment mechanism disclosed herein relates to the minimization of the transmittal of loads to the aircraft structure supporting the ram air turbine and deployment mechanism and the minimization of the size of the required deployment actuator. This is achieved by having the pump supported on the aircraft structure, rather than by the strut, and having the generator close to the pivot axis for the strut. As a result, the strut is lightweight, as is the ram air turbine, and because of this, the moment of inertia of the system relative to the pivot axis of the strut is relatively small. This minimizes the loads transmitted to the aircraft structure upon deploying the ram air turbine.

An object of the invention is to provide a ram air turbine and deployment mechanism having all of the aforesaid new and improved structural features to provide the recited operational advantages.

Another object of the invention is to provide a ram air turbine and deployment mechanism wherein the ram air turbine mounted on a pivotal strut which can deploy the ram air turbine to a deployed position in the airstream may drive a pump which is fixedly mounted within the aircraft fuselage.

Still another object of the invention is to provide a ram air turbine and deployment mechanism wherein the ram air turbine is mounted on a pivoted strut for movement between stowed and deployed positions and the housing of the generator provides a major part of the strut to locate the generator more nearly to the pivot axis for the strut whereby the moment of inertia of the ram air turbine and deployment mechanism relative to the axis of deployment thereof is relatively small to reduce the size of the actuator required for deployment as well as minimize the loads that are transmitted to the aircraft structure upon deployment.

Still another object of the invention is to provide a ram air turbine and deployment mechanism comprising, a rotatable hub assembly with blade means, a strut supporting said ram air turbine for movement between a stowed position within an aircraft fuselage and a deployed position with the rotatable hub assembly outside the aircraft fuselage, means mounting the strut for pivotal movement about a pivot axis located within the aircraft fuselage, a generator having a housing defining a major part of the length of the strut, and means for driving the generator by rotation of the rotatable hub assembly.

An additional object of the invention is to provide a ram air turbine and deployment mechanism comprising, a rotatable hub assembly with blade means, a strut pivotal about a pivot axis located within an aircraft fuselage for supporting said ram air turbine for movement between a stowed position within the aircraft fuselage and a deployed position with the rotatable hub assembly outside the aircraft fuselage, and a power generating device located within the aircraft fuselage and having a rotatable driven member rotatable about an axis aligned with said pivot axis whereby the power generating device can be driven from the rotatable hub assembly by drive means including a gear rotatable on said pivot axis.

Still another object of the invention is to provide a ram air turbine having a rotatable hub assembly with a plurality of blades and a deployment mechanism therefor comprising, a strut pivotal about a pivot axis mounting the ram air turbine for movement between stowed and deployed positions, rotatable shaft means within the strut, a drive shaft connected to the hub assembly, a first angled spiral gear drive interconnecting said drive shaft and said rotatable shaft means, a second angled spiral gear drive having one gear rotatable on said pivot axis and the other gear connected to said rotatable shaft means, and power generating means having a driven member rotatable on an axis aligned with said pivot axis and drivingly connected to said one gear.

BRIEF DESCRIPTION OF THE DRAWINGS

FIG. 1 is a side elevational view of the ram air turbine and deployment mechanism, shown in full line in deployed position and in broken line in a stowed position and with the aircraft compartment shown diagrammatically in broken line;

FIG. 2 is a front elevational view of the ram air turbine with parts in section and as taken generally along the line 2—2 in FIG. 1;

FIG. 3 is a section, on an enlarged scale, taken generally along the line 3—3 in FIG. 2;

FIG. 4 is a sectional view taken generally along the line 4—4 in FIG. 3;

BEST MODES FOR CARRYING OUT THE INVENTION

Figure 6:
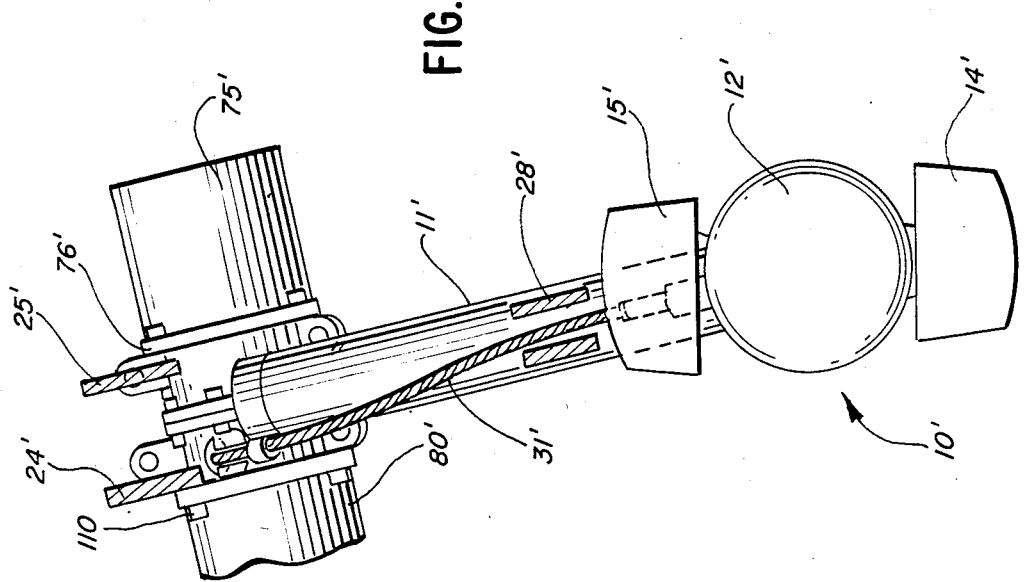
FIG. 6 is a front elevational view of the embodiment shown in FIG. 5 with parts in section, as taken along the line 6—6 in FIG. 5.

A first embodiment of the invention is shown in FIGS. 1 to 4, with a ram air turbine being identified generally at 10 and having an associated deployment mechanism including a strut 11. The ram air turbine has a rotatable hub assembly 12, with a pair of diametrically opposed blades 14 and 15 which impart rotation to the rotatable hub assembly when exposed to an airstream.

The ram air turbine is intended for emergency use as a drive for power-generating means and has a stowed, inactive position, as shown in broken line in FIG. 1, and the deployed, active position, shown in full line. In stowed position, the ram air turbine is stowed within a compartment interiorly of the aircraft fuselage, with the outline of the compartment being shown diagrammatically by broken lines 16, 17 and 18. In the deployed position, the ram air turbine 10 is moved out of the compartment to a position where the blades 14 and 15 are free to rotate without interference with the aircraft fuselage.

The ram air turbine 10 is movable between the stowed and deployed positions, by a pivotal mounting of the strut 11 for pivotal movement about a pivot axis which is the axis of rotation of a shaft 20. The deployment mechanism includes a deployment actuator in the form of a spring-loaded hydraulic cylinder 22 pivotally mounted at 23 to a pair of spaced-apart ears 24 and 25 of a mounting plate and having a rod 26 pivotally connected at 27 to a pair of ears 28 and 29 fixed to the strut 11. An up lock holds the ram air turbine in the stowed position shown in broken line in FIG. 1 and can be manually or automatically activated to free the mechanism for movement, with the result that the spring-loaded cylinder 22 as well as gravity cause the ram air turbine and deployment mechanism to move to the deployed position shown in full line in FIG. 1.

The blades 14 and 15 are held in a predetermined rotative position when the ram air turbine is stowed by means of an indexing mechanism. This mechanism includes an apertured bracket 30 fixed to the rotatable hub assembly 12 (FIG. 3) and an elongate cable 31 supported for lengthwise movement by a pair of apertured brackets 32 and 33 fixed to the strut 11. The cable 31 has a detent pin 35 urged into the aperture in the apertured bracket 30 to lock the blades 14 and 15 in a predetermined rotative position by means of a spring 36. The detent pin 35 is caused to move to the position shown in FIG. 3 wherein the blades are free to rotate by means of the pivotal movement of the strut 11 about the pivot axis defined by the shaft 20. This pivotal movement of the strut brings a cam member 38 fixed to the cable 31 into engagement with an arm 39 fixed to the mounting plate for the ram air turbine and deployment mechanism. Final movement of the ram air turbine to deployed position results in movement of the cable 31 and withdrawal of the detent pin 35 of the cable from the aperture in the apertured bracket 30. A rod could be used instead of cable 31 with the detent pin 35 integral therewith.

The ram air turbine and deployment mechanism are supported by the aircraft structure and by mounting means including the mounting plate 40 suitably attached to the aircraft structure by plural attaching members 41 at the upper end thereof and attaching members 42 at the lower end thereof. The mounting plate 40 has a mounting flange 45 having an outwardly-extending partially-cylindrical housing section 46 which coacts with a similarly-shaped housing section 47 and which are secured together by a series of attaching members 48. The strut 11 has opposite end sections 50 and 51 and an intermediate section 52. The end section 51 has a hollow, generally circular end 54 with cylindrical bearing ends 55 and 56 which rotatably mount the strut within cylindrical openings in the housing sections 46 and 47 with bearing material 57 therebetween. The cylindrical bearing ends 55 and 56 rotatably mount the shaft 20 by means of bearings 60 and 61. The housing sections 46 and 47 are provided with an arcuate slot having sides 62 and 63 and ends 64 and 65 whereby the strut is free to pivot about its pivot axis between the deployed position shown in FIG. 3 and the stowed position wherein the strut end section 51 is close to the end 64 of the arcuate slot.

The strut end section 50 is attached to a housing 70 which rotatably mounts a drive shaft 71 by means of bearings 72 and 73. The ram air turbine is supported by the strut through the support of the drive shaft 71 which is fixed to the rotatable hub assembly 12.

Rotation is imparted to the drive shaft 71 when the rotatable hub assembly 12 rotates.

With the foregoing general description, the inventive aspects of the ram air turbine and deployment mechanism may now be more particularly described. When the ram air turbine is in operation, rotation of the rotatable hub assembly 12 causes operation of power generating means. The power generating means may include one or both of an electrical generator and hydraulic pump and, in the embodiment of FIGS. 1 to 4, both types of power generating means are utilized. The hydraulic pump 75 is located within the compartment in the aircraft fuselage and has a flange 76 in abutting relation with the mounting flange 45 and the pump is secured thereto by attaching members 77 whereby a driven shaft 78 of the pump can be splined to the shaft 20 for rotation about an axis aligned with the pivot axis of the strut 11.

An electrical generator, indicated generally at 80, has a generator housing defining the central section 52 of the strut 11 and is shown formed integrally with the end section 50 of the strut which is tubular. The end section 51 of the strut has an enlarged cylindrical end 81 which is fixed to and encloses an end of the generator housing 52. The generator 80 may be of a known type of construction, having a rotatable armature and with a tubular armature shaft 85 rotatably supported by bearings 86 and 87.

Rotation of the drive shaft 71 driven by the rotatable hub assembly is transmitted to the armature shaft 85 and the drivenshaft 78 of the pump by a drive train including a first angled spiral gear drive having a gear 90 fixed to the drive shaft 71 and a second gear 91 fixed to a rotatable shaft 92 of rotatable shaft means disposed within the strut. The rotatable shaft 92 is supported at one end by a bearing 93 and at its other end is splined at 94 to the armature shaft 85. A second rotatable shaft 96 is located within the tubular end section 51 of the strut. This second rotatable shaft 96 of the rotatable shaft means within the strut 11 is splined to the armature shaft 85 and is rotatably supported by the bearing 87 for the armature shaft 85 and a bearing 98. A second angled spiral gear drive has a first gear 100 fixed to the end of the second rotatable shaft 96 and a second gear 101 fixed to the shaft 20 which is splined to the driven shaft 78 of the hydraulic pump 75.

Rotation of the drive shaft 71 transmits a drive through the first angled spiral gear drive and the first rotatable shaft 92 to the armature shaft 85 of the generator and the drive is transmitted therefrom through the second rotatable shaft 96 and the second angled spiral gear drive to the driven member of the hydraulic pump.

With the angular relation of the strut to the ram air turbine 10, the first angled spiral gear drive can be utilized and, as seen, the gear ratio of the first gear 90 and the second gear 91 of the first angled spiral gear drive results in a reduction of speed in the drive of the generator. As a result, the ram air turbine and generator can operate at different speeds, both of which may be a speed selected for most efficient operation. This enables the ram air turbine to operate at a high speed whereby the diameter of the blades 14 and 15 may be relatively small to minimize the size of the compartment in the aircraft required for stowage. The gear ratio of the second angled spiral gear drive can also be suitably selected for the desired speed of operation of the hydraulic pump 75.

With the disclosed structure, the system reliability is enhanced, since the hydraulic pump 75 is mounted to the aircraft structure and does not have to swing out with the strut when the ram air turbine is deployed. There is no need for swivel joints and the usual number of seals and cores associated with the hydraulic pump and its fluid flow path when the pump is located adjacent the ram air turbine. The mounting of the pump directly to the aircraft structure reduces the pressure drops along the fluid flow paths associated with the hydraulic pump, which is particularly significant when the pump is exposed to low temperature in order to minimize pressure drops in the pump suction line which improves system efficiency. Because of the viscosity of the oil being pumped, it is important to minimize the pressure drops since, otherwise, the hydraulic pump might not pump the oil.

Since the ram air turbine and deployment mechanism is intended for use in an aircraft, it is important to minimize the weight thereof. This has been accomplished by having the generator housing serving as a major part of the strut, the avoidance of fluid lines and swivel joints in the system, removing the pump from support by the strut, locating the generator close to the pivot axis for the strut, and operating the ram air turbine, the generator and the hydraulic pump at their optimum speeds to achieve maximum efficiency whereby heavier, less efficient units need not be utilized.

Further, the strut end section 50 is relatively narrow because it does not have to support large loads and there are no fluid lines from the hydraulic pump that have to pass through it whereby airflow blockage behind the ram air turbine is minimized to improve turbine performance and reduce drag loads. An additional weight saving is in the minimal size of the deployment actuator 22 resulting from a very small moment of inertia of the ram air turbine and deployment mechanism relative to the axis of deployment since the pump is not mounted on the strut and the generator 80 is close to the pivot axis of the strut. This enables the strut to be lightweight and also the turbine is lightweight and, therefore, the moment of inertia is very small. Additionally, the loads that are transmitted to the aircraft structure upon deployment are minimized.

Figure 5:
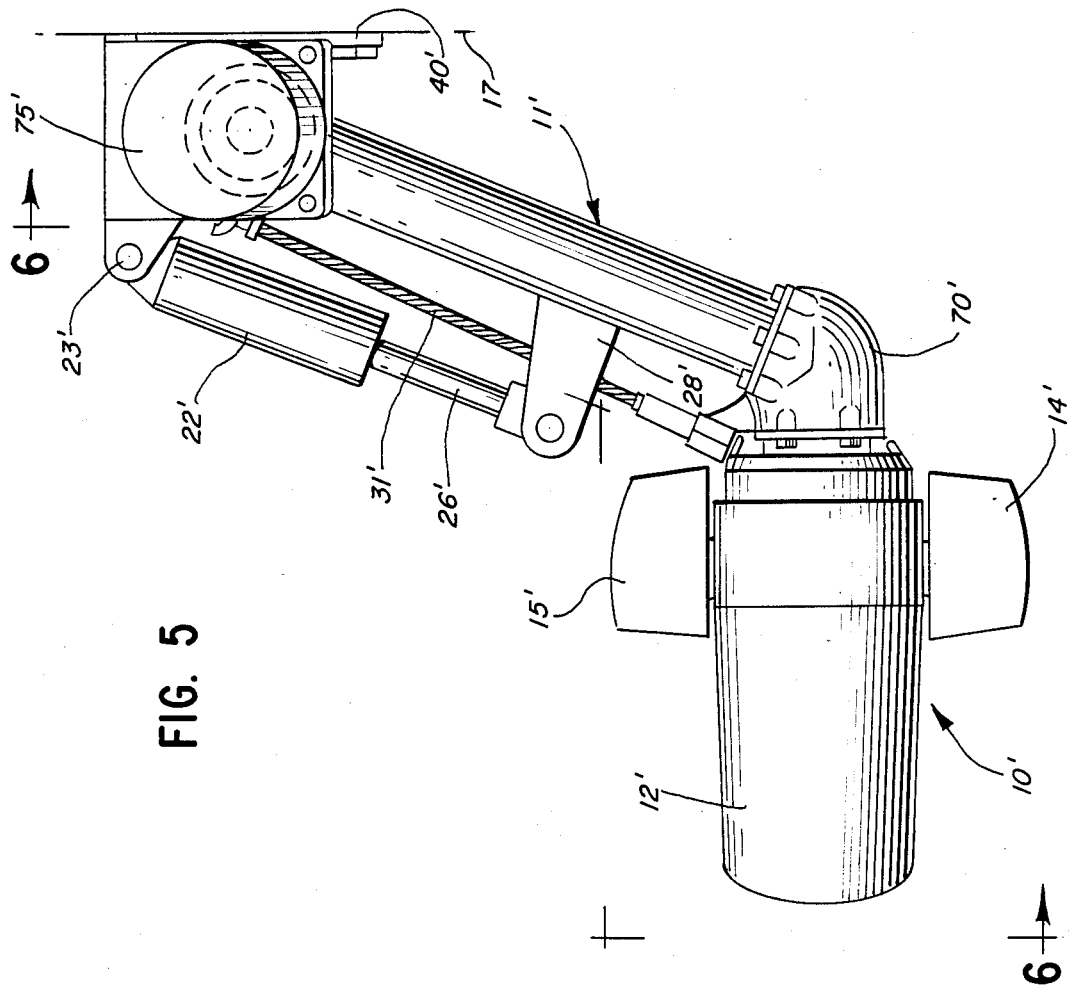
FIG. 5 is a view, similar to the full line view of FIG. 1, showing an alternate embodiment of the invention.

The second embodiment of the invention is shown in FIGS. 5 and 6 and with the structure thereof corresponding to that described in connection with the embodiment of FIGS. 1-4 being given the same reference numeral with a prime affixed thereto. The second embodiment differs with respect to the location of the electrical generator. In this embodiment, the electrical generator 80' does not constitute a major part of the strut 11', but is mounted by threaded members 110 to a mounting flange similar to the mounting flange 45 and part of the housing section 47. The armature shaft of the electrical generator is axially aligned with and connected to the shaft 20 whereby both the pump and the generator are driven from the shaft 20 carrying the second gear 101 of the second angled spiral gear drive. The transmission of the drive from the rotatable hub assembly 12' through the first and second angled spiral gear drives is the same as described in the embodiment in FIGS. 1 to 4.

I claim:

1. A ram air turbine and deployment mechanism comprising, a rotatable hub assembly wih blade means, a gear housing at the rear of said rotatable hub assembly, a strut connected to said gear housing at an angle thereto and supporting said ram air turbine for movement between a stowed position within an aircraft fuselage and a deployed position with the rotatable hub assembly outside the aircraft fuselage, means mounting the strut for pivotal movement about a pivot axis located within the aircraft fuselage, a generator having a housing defining a major part of the length of the strut, and means for driving the generator by rotation of the rotatable hub assembly including a drive shaft in said gear housing, a rotatable shaft in said strut, and an interconnecting angled gear drive in said gear housing.

2. A ram air turbine as defined in claim 1 wherein said generator housing is located lengthwise of said strut to be substantially out of the path of airflow past said blade means when the ram air turbine is deployed.

3. A ram air turbine as defined in claim 1 wherein the interconnecting angled gear drive has meshing spiral gears which are of different diameter to achieve a reduced speed ratio between the rotatable hub assembly and the generator.

4. A ram air turbine and deployment mechanism for use with an aircraft structure including an aircraft fuselage comprising, a rotatable hub assembly with blade means, a strut pivotal about a pivot axis located within said aircraft fuselage for supporting said ram air turbine for movement between a stowed position within the aircraft fuselage and a deployed position with the rotatable hub assembly outside the aircraft fuselage, and a power generating device located within and mounted on the aircraft fuselage and having a rotatable driven member rotatable about an axis aligned with said pivot axis whereby the fixed power generating device can be driven from the rotatable hub assembly by drive means including a gear rotatable on said pivot axis.

5. A ram air turbine as defined in claim 4 wherein said power generating device is a pump.

6. A ram air turbine as defined in claim 4 wherein said power generating device is an electrical generator.

7. A ram air turbine for use with an aircraft and stowable within an aircraft fuselage and having a rotatable hub assembly with a plurality of blades in combination with a deployment mechanism for moving the ram air turbine to a deployed position comprising, a strut pivotal about a pivot axis and mounting the ram air turbine for movement between stowed and deployed positions with a generator having a housing defining a part of the length of the strut, a rotatable shaft means in said strut with an armature of said generator defining a part of the length of the rotatable shaft means, a pump fixed to said aircraft fuselage having an input shaft on an axis aligned with said pivot axis and driven in series with the generator, a drive shaft connected to said hub assembly, a first angled spiral gear drive between said hub assembly and said generator interconnecting said drive shaft and said generator armature, and a second angled spiral gear drive between said generator armature and said pump having one gear fixed to said pump input shaft and rotatable on said pivot axis and the other gear fixed to said rotatable shaft means, said angled spiral gear drives enabling the selection of relative sizes of gears of each pair to provide a desired speed ratio between said hub assembly and the generator and between the generator and the pump.

* * * * *